United States Patent [19]

Lemman

[11] 4,377,295
[45] Mar. 22, 1983

[54] APPARATUS FOR UPRIGHTING A MOTORIZED TWO-WHEELED VEHICLE

[76] Inventor: Cecil L. Lemman, 225 N. 41, Springfield, Oreg. 97477

[21] Appl. No.: 269,497

[22] Filed: Jun. 1, 1981

[51] Int. Cl.³ .............................................. B62H 1/02
[52] U.S. Cl. ............................... 280/303; 280/289 G; 280/293; 280/295
[58] Field of Search ............... 280/293, 295, 298, 301, 280/303, 289 R, 289 G; 254/86 R, 86 H

[56] References Cited

U.S. PATENT DOCUMENTS

| | | | |
|---|---|---|---|
| 2,171,042 | 8/1939 | Minton | 280/289 G |
| 2,308,794 | 1/1943 | Thompson | 280/301 |
| 4,116,467 | 9/1978 | Ewert | 254/86 H |
| 4,145,069 | 3/1979 | Kissick | 280/303 |
| 4,203,500 | 5/1980 | Kamiya | 280/293 |

*Primary Examiner*—Joseph F. Peters, Jr.
*Assistant Examiner*—Donn McGiehan
*Attorney, Agent, or Firm*—Charles N. Hilke

[57] ABSTRACT

This is an apparatus for uprighting a motorized two-wheeled vehicle which is lying on the ground. The apparatus is designed to upright the motorized two-wheeled vehicle no matter which side it is lying on. The apparatus is attached to the motorized two-wheeled vehicle where the fixably mounted device of the apparatus contains two removable retainer pins and two hinges; a pair of side portions each selectively hingably connected to the fixably mounted device, and an expansible center portion containing a piston and cylinder which is connected by a hose to means for pressurizing the cylinder space above the piston. The means for pressuring the cylinder space are either hydraulic or compressed gas. In another embodiment the expansible center portion of the apparatus is replaced by a screw mechanism, each end of which is hingeably connected to the side portions of the apparatus.

6 Claims, 4 Drawing Figures

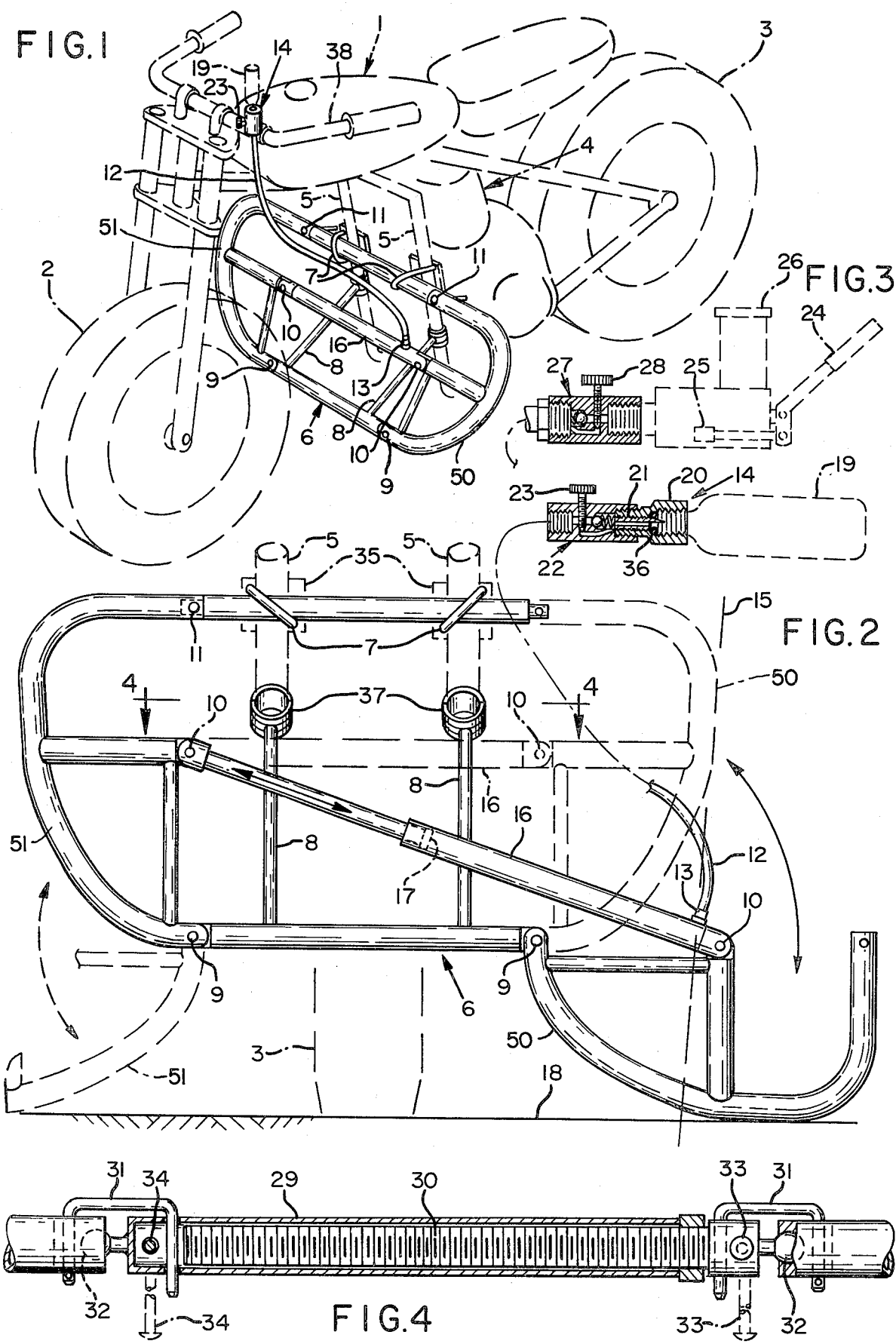

APPARATUS FOR UPRIGHTING A MOTORIZED TWO-WHEELED VEHICLE

FIELD OF INVENTION

This invention relates to an apparatus for uprighting a motorized two-wheel vehicle lying on its side, such as a motorcycle or the like.

PRIOR ART

The applicant is not aware of any apparatus which uprights a motorized two-wheel vehicle lying on its side. There are devices which have been used to prevent turnover of a motorized two-wheeled vehicle. These devices generally consist of subsidiary wheels on either or both sides of the motorized two-wheeled vehicle to increase stability.

SUMMARY OF INVENTION

Since motorized two-wheeled vehicles do not generally include means to prevent turnover, the object of this invention is to provide an apparatus whereby an individual can upright a motorized two-wheeled vehicle lying on its side. With some of the larger motorized two-wheeled vehicles, it is extremely difficult, if not impossible, for an individual to upright a turned over motorized two-wheel vehicle, for example, a motorcycle. The efforts of two or more people are required to upright the motorcycle. The object of this invention is to provide an apparatus attached to the motorcycle to allow an individual to upright the motorcycle.

According to this invention, the apparatus is attached to the motorized two-wheeled vehicle where the fixably mounted device of the apparatus contains two removable retainer pins and two hinges; a pair of side portions each selectively hingably connected to the fixably mounted device; and an expansible center portion containing a piston and cylinder which is connected by a hose to means for pressurizing the cylinder space above the pistons. The means for pressurizing the cylinder space are either hydraulic or compressed gas. In another embodiment the expansible center portion of the apparatus is replaced by a screw mechanism, each end of which is hingeably connected to the side portions of the apparatus.

BRIEF DESCRIPTION OF THE DRAWINGS

Embodiments of this invention will now be described with reference to the accompanying drawings in which:

FIG. 1 is a view of one embodiment of the apparatus attached to a two-wheel motorized vehicle.

FIG. 2 is a front view of the apparatus showing the apparatus in operation on either side wherein the cylinder space is pressurized by gas.

FIG. 3 shows the mechanism for hydraulic pressurization of the cylinder space.

FIG. 4 is a section view of a different embodiment wherein a screw mechanism replaces the piston and cylinder combination in the expansible center portion of the apparatus.

DETAILED DESCRIPTION

Referring to the drawings, numeral 1 denotes a vehicle body having a front wheel 2 and rear wheel 3 and an internal combustion engine 4 which is mounted on a frame 5.

The fixably mounted device of apparatus 6 is connected to the frame 5 by two U bolts 7 which attach to plates 35 welded or by other means connected to the frame 5 and by two metal rods 8 which are in turn attached by appropriate means to the frame 5. Two hinges 9 and two removable retainer pins 11 connect "moveable" side 50 and "fixed" side 51 to the fixably mounted device of apparatus 6. In the expansible center portion of apparatus 6 are two pivots 10. Attached to the center portion of apparatus 6 is a hose 12 which is attached at one end to the center portion of apparatus 6 through a metal nipple 13 and at the other end to handlebars 38. At the handlebar end of the hose 12 is a mechanism 14 to operate the apparatus 6.

The operation of the apparatus is as follows:

During normal driving, the apparatus is in the position shown in FIG. 1. In FIG. 2 the vehicle has fallen over on moveable side 50 and is lying on the ground, which is represented by line 15. The retainer pin 11 is removed from the moveable 50 side of the apparatus 6 lying closer to the ground 15. The mechanism 14 is then activated which causes an increase in pressure in the cylinder 16 of the center portion of the apparatus 6. This in turn causes the piston 17 to push against the frame 5 and the cylinder 16 to push against the moveable 50 side of the apparatus 6 lying on the ground. As the pressure increases between the cylinder 16 and the piston 17, the moveable 50 side of apparatus 6 opens on hinges 9 causing vehicle to upright. Thus, when completed, the ground is shown as line 18. In FIG. 2, the "fixed" side of 51 remains attached by retainer pin 11 to the fixably mounted device of apparatus 6.

In the gas pressure design for mechanism 14 shown in FIG. 2, a capsule 19 is lightly screwed into a base 20 which contains a pin mechanism 21 for puncturing capsule 19 to release gas pressure. An O-ring 36 is contained in base 20 to seal pressure. Base 20 is screwed into a flow control valve system 22. Capsule 19 is tightly screwed into the pin mechanism 21 causing capsule 19 to be punctured. By opening the control valve 23 the gas pressure is released into the hose 12, which is connected with the cylinder 16. Thus, the operator can control the rate at which the motorcycle uprights by the use of the control valve 23. The gas pressure is released by slightly unsealing capsule 19 from mechanism 20 which allows the pressure contained in capsule 19, cylinder 16 and hose 12 to escape.

In the hydraulic system, FIG. 3 shows a lever 24 with a hydraulic pump 25 and resevoir 26. The hydraulic fluid is forced into the flow control valve system 27 by operation of the lever 24 and hydraulic pump 25, which forces hydraulic fluid into the hose 12 and then into the cylinder 16. The vehicle uprights as previously described. In order to relieve the hydraulic pressure in the system, the valve 28 is opened. This allows the hydraulic fluid to return through the bypass in the flow control valve system 27 and into the hydraulic reservoir 26.

In another embodiment of this invention, the expansible center portion identified by cylinder 16 and piston 17 may be replaced as shown in FIG. 4 which consists of two main parts, the tube 29, which contains screw threads, and the screw 30. Clamps 31 to prevent the tube 29 and screw 30 from turning are provided at opposite ends of the tube 29 and screw 30. Opposite ends of the tube 29 and screw 30 are each supplied with a ball joint 32. Two sliding bars 33 and 34 are incorporated into opposite ends of the tube 29 and screw 30 with sliding bar 33 being attached to the screw 30 and sliding bar 34 being attached to the tube 29. The sliding bars 33 or 34 act as levers to make easy the turning by hand of the screw 30 or the tube 29, respectively. Sliding bars 33 and 34 are wider at each end so they cannot slide through the ends of screw 30 or tube 29. The lengths of sliding bars 33 and 34 are greater than the diameters of either the screw 30 or the tube 29 so that a hand can grip sliding bar 33 or 34. Sliding bars 33 and 34 may be replaced by ratchets if desired. Thus, as is readily seen, the interaction of forces between the tube 29 which contains screw threads and the screw 30 allow the apparatus 6 to be operated from either side, whichever is most convenient for the operator. The clamp 31 is simply removed from the side the operator intends to turn. Removable retainer pin 11 is again removed from the side closer to the ground.

As can readily be seen when examining FIG. 2, if the vehicle were lying on the fixed 51 side, the apparatus 6 would produce the same result, only the opposite retainer pin 11 would be taken out. The dotted lines would show how the mechanism on the fixed 51 side would work.

From the foregoing embodiments can be seen the following general features: the apparatus 6 comprises a fixably mounted device with means connecting to the frame 5; a pair of side portions each selectively hingably connected to the fixably mounted device; an expansible center portion connected between each of said pair of side portions; and means for expanding an expansible center portion.

The apparatus 6 may be operated through a variety of changes and modifications including an electrical compressor or a hand pump which are readily apparent to those skilled in the art. Apparatus 6 is shown in only one design but it is susceptable of numerous changes and modifications as known to those skilled in the art. I therefore do not wish to be limited to the details shown and described herein but intend to cover all such changes and modifications as are encompassed by the scope of the appended claims.

What is claimed is:

1. Apparatus for uprighting a motorized two-wheel vehicle comprising a vehicle body, front and rear wheels supporting said body, a drive engine supported on said body, a fixably mounted device with means connecting to the frame, a pair of side portions each selectively hingeably connected to the fixably mounted device, an expansible center portion connected between each of said pair of side portions, and means for expanding said center portion.

2. Apparatus as claimed in claim 1 wherein said expansible center portion comprises a piston and cylinder.

3. Apparatus as claimed in claim 1 wherein said expansible center portion comprises a tube and screw.

4. Apparatus as claimed in claim 1 wherein said means for expanding said expansible center portion comprises hose means interconnected to the expansible center portion and to a flow control valve system, storage means for pressurized gas, and means for releasing pressurized gas into a flow control valve system.

5. Apparatus as claimed in claim 1 wherein said means for expanding said expansible center portion comprises hose means interconnected to the expansible center portion and to a flow control valve system, storage means for a fluid and means for pressurizing fluid and forcing fluid into a flow control valve system.

6. Apparatus as claimed in claim 1 wherein said means for expanding said expansible center portion comprises an inside sliding and an outside sliding bar.

* * * * *